(12) United States Patent
Kondou et al.

(10) Patent No.: US 11,376,722 B2
(45) Date of Patent: Jul. 5, 2022

(54) STRIKING TOOL

(71) Applicant: MAX CO., LTD., Tokyo (JP)

(72) Inventors: Yoshihiko Kondou, Tokyo (JP); Takashi Suzuki, Tokyo (JP)

(73) Assignee: MAX CO., LTD., Tokyo (JP)

( * ) Notice: Subject to any disclaimer, the term of this patent is extended or adjusted under 35 U.S.C. 154(b) by 127 days.

(21) Appl. No.: 16/279,257

(22) Filed: Feb. 19, 2019

(65) Prior Publication Data

US 2019/0255690 A1 Aug. 22, 2019

(30) Foreign Application Priority Data

Feb. 20, 2018 (JP) .............................. JP2018-028093
Jan. 15, 2019 (JP) .............................. JP2019-004686

(51) Int. Cl.
*B25C 1/06* (2006.01)
*B25F 5/00* (2006.01)

(52) U.S. Cl.
CPC ................ *B25C 1/06* (2013.01); *B25F 5/001* (2013.01); *B25F 5/008* (2013.01)

(58) Field of Classification Search
CPC ... B25C 1/06; B25C 5/15; B25F 5/001; B25F 5/008; B23Q 11/127
See application file for complete search history.

(56) References Cited

U.S. PATENT DOCUMENTS

| 3,426,261 A | 2/1969 | Wallin et al. |
| 2011/0180286 A1* | 7/2011 | Oomori .................... H02K 9/06 173/217 |
| 2011/0303428 A1 | 12/2011 | Roth et al. |
| 2011/0303718 A1 | 12/2011 | Spasov et al. |
| 2012/0279736 A1* | 11/2012 | Tanimoto .............. B25B 21/026 173/117 |
| 2013/0284475 A1* | 10/2013 | Hirabayashi ............ B25F 5/001 173/47 |
| 2014/0076953 A1 | 3/2014 | Ekstrom et al. |
| 2016/0250743 A1* | 9/2016 | Kikuchi .................. B25F 5/008 173/46 |
| 2017/0326718 A1* | 11/2017 | Meixner ............. H01M 10/486 |
| 2018/0311806 A1* | 11/2018 | Mascall .................. B25F 5/008 |

FOREIGN PATENT DOCUMENTS

| CN | 102284934 B | 9/2016 |
| JP | 2010-201529 A | 9/2010 |
| JP | 2012-000749 A | 1/2012 |
| JP | 2012-236252 A | 12/2012 |
| WO | 2016174995 A1 | 11/2016 |

OTHER PUBLICATIONS

European Search Report issued in Application No. 19158221.2, dated Nov. 5, 2019, 7 pages.
Taiwanese Office Action in corresponding TW Application 108105428 dated Jul. 7, 2021. (9 pp).

* cited by examiner

*Primary Examiner* — Anna K Kinsaul
*Assistant Examiner* — Veronica Martin
(74) *Attorney, Agent, or Firm* — Weihrouch IP (57) ABSTRACT

A striking tool includes: a striking mechanism configured to strike a fastener into a member to be struck; a motor configured to drive the striking mechanism; and a clutch provided between the striking mechanism and the motor and configured to switch transmission and interruption of a drive force of the motor to the striking mechanism.

16 Claims, 4 Drawing Sheets

STRIKING TOOL

CROSS-REFERENCE TO RELATED APPLICATIONS

This application is based upon and claims the benefit of priority from prior Japanese patent application No. 2018-028093, filed on Feb. 20, 2018 and Japanese patent application No. 2019-004686, filed on Jan. 15, 2019, the entire contents of which are incorporated herein by reference.

TECHNICAL FIELD

The present invention relates to a striking tool configured to strike a fastener such as a nail, a staple, a pin and the like to a member to be struck such as wood, plaster board, steel plate, concrete and the like.

BACKGROUND ART

An electric striking tool configured to accumulate energy in a spring and the like by drive of a motor, and to strike a head fastener, which is supplied from a magazine, into a member to be struck by discharging the accumulated energy is available (for example, refer to Patent Document 1). In this kind of the striking tool, the motor is driven when the energy is accumulated upon a striking operation. For this reason, in order to increase an output of a striking tool by using a spring having a high spring modulus, it is necessary to drive the motor with high load, so that heat generation from the motor increases.

As means for cooling the motor in the striking tool, following technologies have been suggested. For example, a striking tool having a cooling fan attached to a motor and configured to cool the motor by rotating the fan upon drive of the motor has been suggested. Also, Patent Document 2 discloses a striking device including a cooling system having a blowing device configured to cool an electric motor in accordance with a state of the motor.

Patent Document 1: JP-A-2012-236252
Patent Document 2: JP-A-2012-749

However, in a case where the fan is provided to the motor of the striking tool disclosed in Patent Document 1 and the like, the motor just rotates several times during the striking operation, and a time period for which the motor drives is shorter, as compared to a time period for which the motor stops. As a result, the heat generation is larger, as compared to a cooling effect by the fan, so that it is not possible to sufficiently cool the motor. Also, in the striking device disclosed in Patent Document 2, it is necessary to separately provide the cooling system including the electric motor for cooling the motor for drive, so that a weight of the device increases and a structure of the device is complicated.

The present invention has been made in view of the above situations, and an object thereof is to provide a striking tool having a long service time and capable of using a motor for high output.

SUMMARY OF INVENTION

According to an aspect of the invention, there is provided a striking tool comprising: a striking mechanism configured to strike a fastener into a member to be struck; a motor configured to drive the striking mechanism; and a clutch provided between the striking mechanism and the motor and configured to switch transmission and interruption of a drive force of the motor to the striking mechanism.

According to an aspect of the invention, there is also provided a striking tool comprising: a striking mechanism configured to strike a fastener into a member to be struck; a motor configured to drive the striking mechanism; a cooling unit configured to cool the motor; and a clutch provided between the motor and the cooling unit, the clutch configured to transmit a drive force to the cooling unit during drive of the motor and to interrupt transmission of the drive force to the cooling unit during stop or deceleration of the motor.

DESCRIPTION OF EMBODIMENTS

Hereinafter, a preferred illustrative embodiment of the present invention will be described in detail with reference to the accompanying drawings. For convenience sake, a size ratio in the drawings is shown with being enlarged and may be different from an actual ratio.

(Configuration Example of Striking Tool 1)

Figure 1:
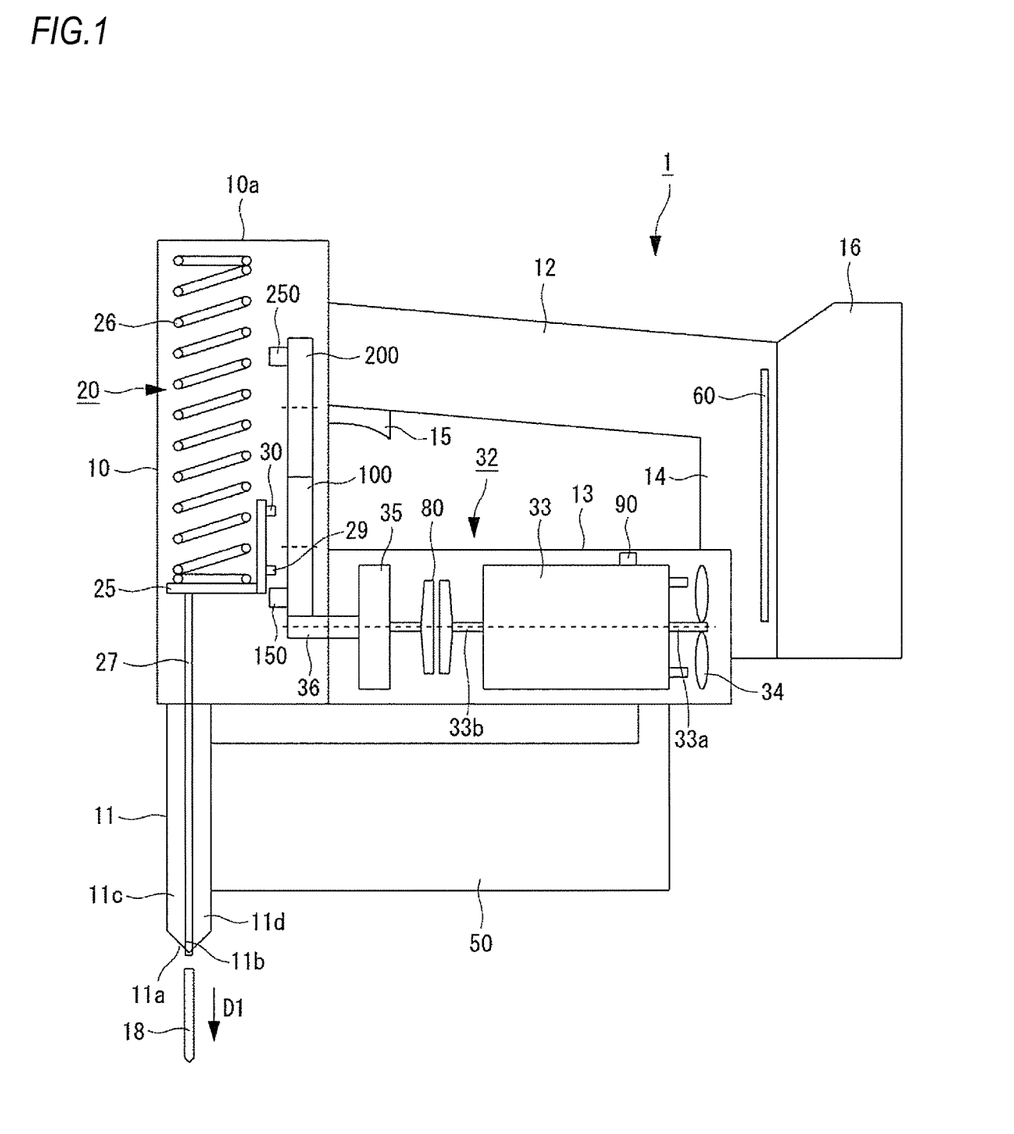
FIG. 1 is a sectional view of a striking tool related to an illustrative embodiment of the present invention.

FIG. 1 is a pictorial view depicting an example of a configuration of a striking tool 1 related to an illustrative embodiment of the present invention. As shown in FIG. 1, the striking tool 1 is an electric tool configured to strike a fastener 18 such as a nail, a staple, a pin and the like into a member to be struck such as wood, plaster board, steel plate, concrete and the like, and includes a body 10, a control unit 60, a trigger 15, a striking mechanism 20, a drive mechanism 32 and a magazine 50.

The body 10 has a body main part 10a, and a lower end of the body main part 10a is provided with a nose part 11 having an ejecting port 11b through which the fastener 18 is to be struck to the member to be struck. The nose part 11 is configured by joining a driver guide 11c and a wear plate 11d configuring the ejecting port 11b. A tip portion of the driver guide 11c, i.e., a tip portion of the ejecting port 11b is provided with a contact arm 11a that is a part of a safety device. The contact arm 11a is provided with protruding around the ejecting port 11b, and allows an operation of the trigger in conjunction with a trigger device when pressed to the member to be struck.

The body main part 10a is provided with a grip part 12, which is to be gripped by a user, and an auxiliary grip part 13, which is auxiliary to the grip part 12, so as to be substantially perpendicular to a central axis, i.e., substantially parallel with the magazine 50. The grip part 12 and the auxiliary grip part 13 are coupled by a bridge part 14, and form a substantially annular shape so that the grip part 12 can be gripped.

The bridge part 14 is arranged thereon with a control unit 60 in which a power supply circuit, a control circuit of a drive motor, a microcomputer configured to control entire operations in correspondence to inputs from a variety of switches such as a detection switch of the contact arm 11a, and the like are incorporated therein. When a temperature of a drive motor 33 or the like reaches a predetermined temperature, when a number of times of actual striking reaches a predetermined number of times of striking, or the like, during a situation, other than a striking operation of the striking tool 1, the control unit 60 executes a cooling mode of controlling connection and disconnection of a clutch 80 (which will be described later) to idle the drive motor 33, thereby driving a cooling unit to cool the drive mechanism 32 such as the drive motor 33. As used herein the term "idling" means a state where transmission of a drive force of the drive motor 33 to the striking mechanism 20 is interrupted and a fan 34 (which will be described later) can be driven without driving the striking mechanism 20.

A root part of the grip part 12 to the body main part 10$a$, which is provided at a rear side of the body main part 10$a$, is provided with the trigger 15 protruding toward the annular part. Also, the bridge part 14 is provided with a battery mounting part to which a battery pack 16 is to be mounted. The battery pack 16 to be mounted to the battery mounting part has a secondary battery embedded therein, such as a lithium ion secondary battery, a nickel hydrogen secondary battery and the like, for example, and is configured to feed power to the drive mechanism and the like in the body 10 via the control unit 60.

In the body main part 10$a$, the striking mechanism 20 for striking the fastener 18 is arranged. The striking mechanism 20 includes a plunger 25 and a plunger spring 26 that is an urging member configured to urge the plunger 25 in one direction. The plunger 25 is engaged to a guide rail (not shown), and is configured to be moveable in the body main part 10$a$. The plunger spring 26 is a compression coil spring, and urges the plunger 25 in a direction of an arrow D1 of FIG. 1 in which the fastener 18 is to be struck.

A driver 27 having a long thin plate shape is fixed to the plunger 25. The driver 27 is to strike the head fastener 18 supplied from the magazine 50 into the ejecting port 11$b$, is guided by a guide recess of the driver guide 11$c$, and is configured to linearly move in accordance with an operation of the plunger 25.

At a rear side (the drive mechanism 32-side) of the plunger 25, a first engaging protrusion 29 to which a first torque roller 150 of the drive mechanism 32 configured to move the plunger 25 is to be engaged, and a second engaging protrusion 30 to which a second torque roller 250 is to be engaged are provided.

In the meantime, the striking mechanism 20 may be provided with a buffer mechanism (not shown) for buffering a shock that is to be generated when striking the fastener 18. In the meantime, since a well-known technology can be adopted for the buffer mechanism, the detailed description thereof is omitted.

In the auxiliary grip part 13, the drive mechanism 32 for driving the striking mechanism 20 is arranged. The drive mechanism 32 is a mechanism configured to move the plunger 25 upward in the body main part 10$a$ against an elastic force of the plunger spring 26. The drive mechanism 32 includes the drive motor 33 that is a drive source. For the drive motor 33, a DC brushless motor or the like may be adopted, for example. A spindle of the drive motor 33 is meshed with a planetary gear mechanism 35 that is a deceleration mechanism and has an excellent torque transmission ability, via the clutch 80 (which will be described later). The planetary gear mechanism 35 is meshed with an arm gear 36.

Also, the fan 34 is attached to a rotary shaft 33$a$ at a rear side of the drive motor 33. The fan 34 is a fan for cooling the drive motor 33, and is configured to rotate in conjunction with drive of the drive motor 33, thereby cooling the drive motor 33. In the meantime, as means for cooling the drive motor 33, a water cooling unit, a Peltier element and the like configured to operate in conjunction with drive of the drive motor 33 may also be adopted, in addition to the fan 34. The water cooling unit and the Peltier element may be arranged in the vicinity of the drive motor 33, for example.

In the vicinity of the drive motor 33, a temperature sensor 90 configured to measure a temperature of the drive motor 33 is arranged. The temperature sensor 90 is configured to measure a temperature of the drive motor 33 or a part around thereof and to supply information about the measured temperature to the control unit 60. In the meantime, the temperature sensor 90 may be directly attached to the drive motor 33 and may be configured to measure a temperature of the drive mechanism 32, other than the drive motor 33.

The arm gear 36 meshes with a first torque gear 100 configured to move the plunger 25 against an elastic force of the plunger spring 26, and the first torque gear 100 meshes with a second torque gear 200. The first torque gear 100 is provided with the first torque roller 150 that is a first drive projection to be engaged with the first engaging protrusion 29 of the plunger 25. The second torque gear 200 is provided with the second torque roller 250 that is a second drive projection to be engaged with the second engaging protrusion 30 of the plunger 25.

The clutch 80 is an electromagnetic clutch, for example, and is arranged between the drive motor 33 and the planetary gear mechanism 35. A side of the clutch 80 facing toward the drive motor 33 is connected with a rotary shaft 33$b$ of the drive motor 33, and a side of the clutch 80 facing toward the striking mechanism 20 is connected with a rotary shaft of the planetary gear mechanism 35. The clutch 80 is connected to the control unit 60, and is connected (engaged) or disconnected (disengaged) under control of the control unit 60, thereby switching transmission and interruption of a drive force of the drive motor 33 to the striking mechanism 20. In this case, when the clutch 80 is connected, a striking operation is executed by drive of the drive motor 33, and when the clutch 80 is disconnected, the cooling mode is executed by the idling of the drive motor 33. In the meantime, the arrangement position of the clutch 80 is not limited to a position between the drive motor 33 and the planetary gear mechanism 35. For example, the clutch 80 may be arranged between the planetary gear mechanism 35 and the first torque gear 100.

Also, the clutch 80 may be configured by a one-way clutch, instead of the electromagnetic clutch. The one-way clutch is a mechanism configured to transmit a force of only a specific direction. For example, when the one-way clutch is attached to the rotary shaft 33$b$ of the drive motor 33, the one-way clutch transmits a drive force of only a specific rotating direction (positive rotation). In this case, the one-way clutch is configured to switch transmission and interruption of the drive force of the drive motor 33 to the striking mechanism 20 in accordance with a rotating direction of the drive motor 33. When executing the striking operation, the control unit 60 rotates positively the one-way clutch to transmit the drive force of the drive motor 33 to the striking mechanism 20 by positive rotation of the drive motor 33, thereby performing a striking operation by the striking mechanism 20. Also, when executing the cooling mode, the control unit 60 rotates negatively the one-way clutch to interrupt the transmission of the drive force of the drive motor 33 to the striking mechanism 20 and rotates the fan 34 to cool the drive motor 33 by negative rotation of the drive motor 33. By using the one-way clutch, it is possible to simplify the configuration of the clutch 80, as compared to the configuration where the electromagnetic clutch is used.

The magazine 50 is attached to the nose part 11 of the body main part 10a. Specifically, the magazine 50 is fixed to the wear plate 11d configuring the nose part 11 by screw fixing or the like, and is linearly provided in a direction intersecting, herein substantially perpendicularly intersecting with a central axis direction of the body 10, i.e., a striking direction (the direction of the arrow D1) of the fastener 18. In the magazine 50, plate-shaped coupling nails (not shown) where the fasteners 18 are coupled by an adhesive or the like are accommodated.

(Operation Example (First Example) During Striking of Striking Tool 1)

Subsequently, an example of an operation that is performed during striking of the striking tool 1 is described. When the contact min 11a of the nose part 11 of the striking tool 1 is pressed to a target and the trigger 15 is pulled, the drive motor 33 is driven. In conjunction with the drive of the drive motor 33, the first torque roller 150 of the first torque gear 100 being rotating is engaged to a lower surface of the first engaging protrusion 29 of the plunger 25, thereby pushing up the plunger 25 against the plunger spring 26 in a direction of an arrow D2 opposite to the direction of the arrow D1. Immediately before the first torque roller 150 reaches the top part, the second torque roller 250 of the second torque gear 200 is engaged to a lower surface of the second engaging protrusion 30 of the plunger 25, thereby pushing up the plunger 25 against the plunger spring 26 in the direction of the arrow D2. Also, when the second torque gear 200 rotates and the second torque roller 250 is disengaged from the second engaging protrusion 30, the plunger 25 is moved powerfully toward the nose part 11 by the elastic force of the plunger spring 26. Thereby, the driver 27 joined to the plunger 25 is moved in the striking direction (the direction of the arrow D1), thereby striking out the fastener 18 supplied to the ejecting port 11b toward the target outside the striking tool.

(Operation Example (First Example) in Cooling Mode of Striking Tool 1)

Figure 2:
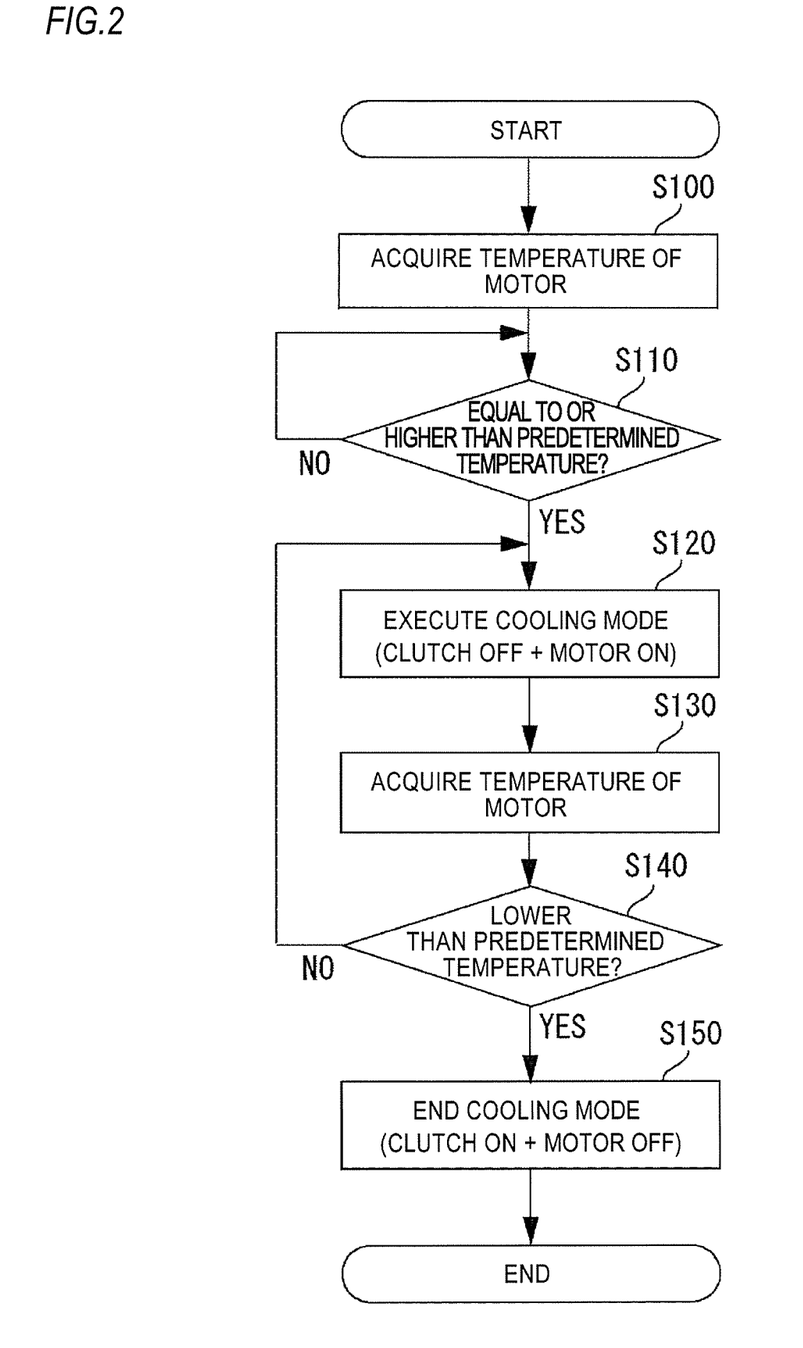
FIG. 2 is a flowchart depicting an operation example when a cooling mode of the striking tool is executed (first example).

FIG. 2 is a flowchart depicting an operation example of the striking tool 1 when the cooling mode of the present invention is executed (First Example). A CPU (Central Processing Unit) of the control unit 60 implements processing shown in the flowchart of FIG. 2 by executing software read out from a ROM (Read Only Memory), for example.

As shown in FIG. 2, in step S100, the control unit 60 acquires a temperature of the drive motor 33 configuring the drive mechanism 32 from the temperature sensor 90. When the processing of step S100 is over, the control unit 60 proceeds to step S110.

In step S110, the control unit 60 determines whether the temperature of the drive motor 33 acquired from the temperature sensor 90 is equal to or higher than a reference temperature (threshold value) set as a reference when executing the cooling mode. The reference temperature may be stored in advance in a memory and the like embedded in the control unit 60, for example. When it is determined that the temperature of the drive motor 33 acquired from the temperature sensor 90 is not equal to or higher than the reference temperature, the control unit 60 continues to monitor the temperature of the drive motor 33. On the other hand, when it is determined that the temperature of the drive motor 33 acquired from the temperature sensor 90 is equal to or higher than the reference temperature, the control unit 60 proceeds to step S120.

In step S120, the control unit 60 executes the cooling mode for lowering the temperature of the drive motor 33. Specifically, the control unit 60 disconnects the clutch 80 and rotatively drives the drive motor 33. Thereby, the drive motor 33 is idled, so that the fan 34 attached to the drive motor 33 rotates, the air is blown to the drive motor 33 and the drive motor 33 is thus cooled. At this time, since the clutch 80 is disconnected, the drive force of the drive motor 33 is not transmitted to the striking mechanism 20. When the processing of step S120 is over, the control unit 60 proceeds to step S130.

In step S130, the control unit 60 acquires again the temperature of the drive motor 33 configuring the drive mechanism 32 from the temperature sensor 90. When the processing of step S130 is over, the control unit 60 proceeds to step S140.

In step S140, the control unit 60 determines whether the temperature of the drive motor 33 acquired from the temperature sensor 90 is lower than the reference temperature. In the meantime, the reference temperature may be set to a temperature different from the temperature used in step S100. When it is determined that the temperature of the drive motor 33 acquired from the temperature sensor 90 is not lower than the reference temperature, the control unit 60 continues to execute the cooling mode. On the other hand, when it is determined that the temperature of the drive motor 33 acquired from the temperature sensor 90 is lower than the reference temperature, the control unit 60 proceeds to step S150.

In step S150, the control unit 60 ends the cooling mode. Specifically, the control unit 60 stops the drive motor 33 and connects the clutch 80. In the meantime, when the striking operation is subsequently started, the control unit 60 may not stop the drive of the drive motor 33 and may execute the striking operation when a contact switch and a trigger switch turn on.

(Operation Example (Second Example) in Cooling Mode of Striking Tool 1)

Figure 3:
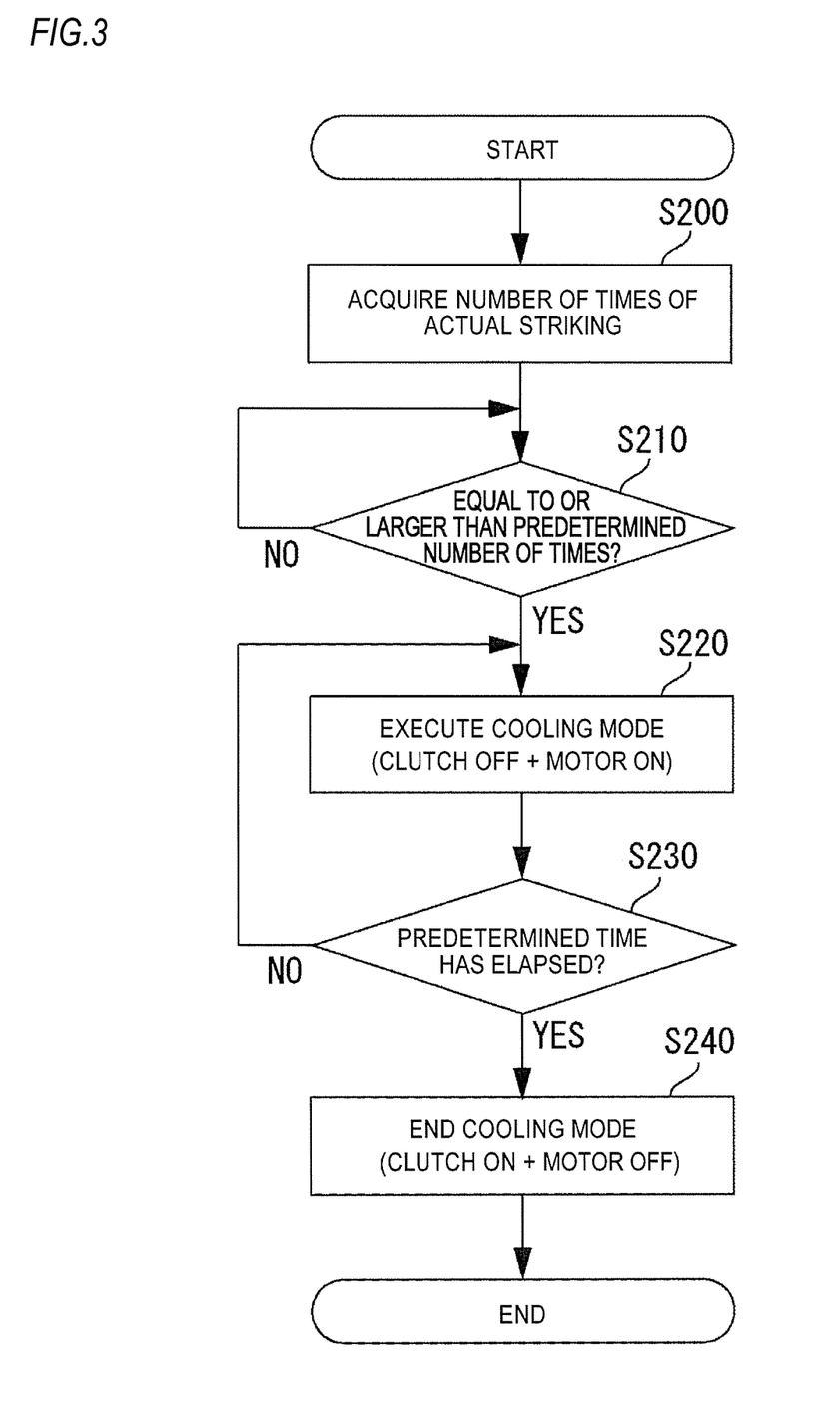
FIG. 3 is a flowchart depicting an operation example when the cooling mode of the striking tool is executed (second example).

FIG. 3 is a flowchart depicting another operation example of the striking tool 1 when the cooling mode of the present invention is executed (Second Example). The CPU of the control unit 60 implements processing shown in the flowchart of FIG. 3 by executing the software read out from the ROM, for example.

As shown in FIG. 3, in step S200, the control unit 60 acquires information about a number of times of actual striking based on the striking operation. The number of times of actual striking may be calculated by the control unit 60 counting the number of ON times of the trigger switch and the contact switch (not shown) or by the control unit 60 counting vibrations upon the striking operation, for example. When the processing of step S200 is over, the control unit 60 proceeds to step S210.

In step S210, the control unit 60 determines whether the acquired number of times of actual striking is equal to or larger than a reference number of times of actual striking (threshold value) set as a reference when executing the cooling mode. That is, the control unit 60 predicts temperatures of the drive motor 33 and the like from the number of times of actual striking of the striking tool 1. Here, as the number of times of actual striking, the number of times of actual striking from start of the operation or the number of times of actual striking per unit time may be used. For the reference number of times of actual striking, different threshold values may be respectively set in correspondence to the number of times of actual striking to be used. The reference number of times of actual striking may be stored in advance in the memory and the like embedded in the control unit 60, for example. When it is determined that the acquired number of times of actual striking is not equal to or larger than the reference number of times of actual striking, the control unit 60 continues to monitor the number of times of actual striking of the striking tool 1 because a possibility that the drive motor 33 and the like are at high temperatures is low. On the other hand, when it is determined that the acquired number of times of actual striking is equal to or larger than the reference number of times of actual striking, the control unit 60 proceeds to step S220 because a possibility that the drive motor 33 and the like are at high temperatures is high.

In step S220, the control unit 60 executes the cooling mode for lowering the temperature of the drive motor 33. Specifically, the control unit 60 disconnects the clutch 80 and rotatively drives the drive motor 33. Thereby, the drive motor 33 is idled, so that the fan 34 attached to the drive motor 33 rotates, the air is blown to the drive motor 33 and the drive motor 33 is thus cooled. When the processing of step S220 is over, the control unit 60 proceeds to step S230.

In step S230, the control unit 60 determines whether a preset reference time has elapsed from execution of the cooling mode. When it is determined that the preset reference time has not elapsed from execution of the cooling mode, the control unit 60 returns to step S220 and continues to execute the cooling mode. On the other hand, when it is determined that the preset reference time has elapsed from execution of the cooling mode, the control unit 60 proceeds to step S240.

In step S240, the control unit 60 ends the cooling mode. Specifically, the control unit 60 stops the drive motor 33 and connects the clutch 80. In the meantime, when the striking operation is subsequently started, the control unit 60 may execute the striking operation without stopping the drive of the drive motor 33.

In step S230 of FIG. 3, it is determined whether or not to end the cooling mode by using the time. However, like step S140 of FIG. 2, it may be determined whether or not to end the cooling mode by using the reference temperature. Also, when it is determined whether or not to execute the cooling mode only by the number of times of actual striking, a configuration where the striking tool 1 shown in FIG. 1 is not provided with the temperature sensor 90 may be adopted.

(Operation Examples (Others) in Cooling Mode of Striking Tool 1)

Subsequently, a control example, which is different from the above operations, of the striking tool 1 when executing the cooling mode is described. The control unit 60 disconnects the clutch 80 before the striking operation, and when the contact arm 11a is pressed to the member to be struck and thus the contact switch turns on, the control unit 60 rotates (idles) the drive motor 33 to execute the cooling mode. Continuously, when the trigger 15 is pulled and thus the trigger switch turns on, the control unit 60 connects the clutch 80 in a driving state of the drive motor 33. Thereby, the drive force of the drive motor 33 is transmitted to the striking mechanism 20 via the clutch 80, so that the striking operation can be executed.

According to the above control, it is possible to accomplish the cooling effect through the blowing of the fan 34 by the drive of the drive motor 33 during a situation, other than the striking operation, and to improve responsiveness of the striking operation by driving first the drive motor 33. Also, it is possible to reduce a current value upon start of the operation of the striking mechanism 20. Thereby, it is possible to increase a work rate (the number of struck fasteners) per one charge of the battery. In addition to the above controls, the striking operation may be performed by connecting the clutch 80 when the contact switch turns on, and driving the drive motor 33 when the trigger switch turns on.

Also, the cooling mode may be executed during a situation, other than the striking operation, for example, when the contact switch or trigger switch is not turned on for a predetermined time period from the ending of the striking operation. Also, when executing continuously the striking operation several times, the cooling mode may be executed during the striking operation. In this case, for example, when the electromagnetic clutch is used as the clutch 80, it is possible to smoothly switch the striking operation and the cooling mode even during the continuous operations.

As described above, according to the illustrative embodiment, the cooling mode of cooling the drive mechanism 32 such as the drive motor 33 is provided. Therefore, since it is possible to use as a high-output motor for high load (a motor having a large amount of heat generation) as the drive motor 33, it is possible to increase an output of the striking tool 1. Also, since it is possible to adopt a small motor as the drive motor 33, it is possible to reduce a weight of the striking tool 1 and to save the cost thereof.

Also, according to the illustrative embodiment, the striking tool 1 is provided with the cooling mode, so that it is possible to suppress the increase in temperature of the drive mechanism 32 and the like. Thereby, it is possible to continuously perform the operation for a long time. That is, since the number of struck fasteners until a protection circuit configured to stop the striking operation on the basis of the temperature of the drive mechanism 32 and the like increases, it is possible to increase the continuous work rate. Also, according to the illustrative embodiment, the striking tool 1 is provided with the cooling mode, so that it is not used at excessively high temperatures. Therefore, it is possible to avoid the failure of the drive motor 33 and the like, so that it is possible to prolong the service life of the striking tool 1.

Modified Embodiment

Figure 4:
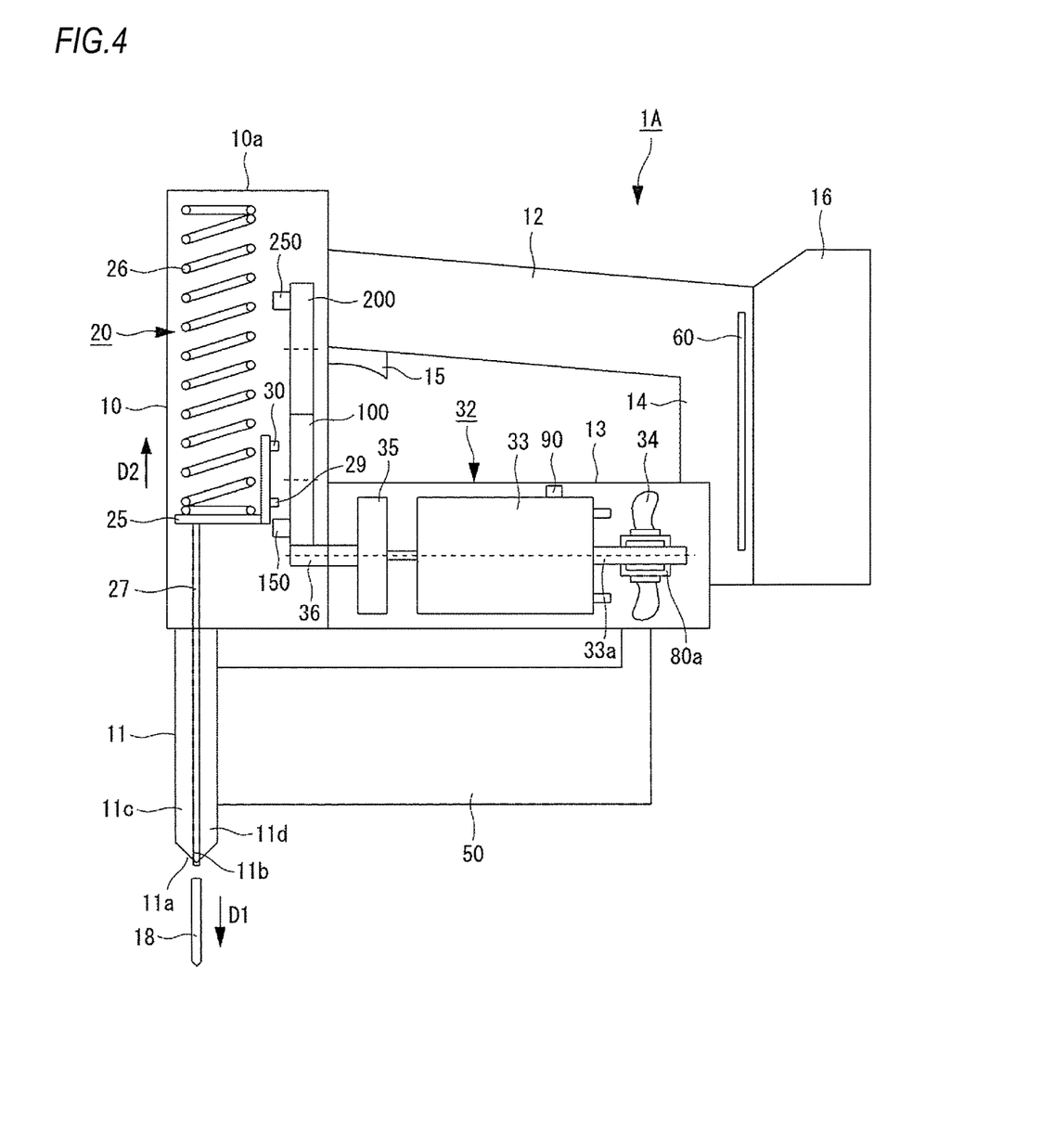
FIG. 4 is a sectional view of a striking tool related to a modified embodiment of the present invention.

Subsequently, a striking tool 1A, which is a modified embodiment of the striking tool 1, is described. FIG. 4 is a sectional view of the striking tool 1A related to the modified embodiment. In the meantime, the common configurations to the striking tool 1 shown in FIG. 1 are denoted with the same reference numerals, and the descriptions thereof are omitted or simplified.

(Configuration Example of Striking Tool 1A)

The striking tool 1A includes the striking mechanism 20 configured to strike the fastener 18 into a member to be struck, the drive motor 33 configured to drive the striking mechanism, the fan 34 configured to cool the drive motor 33, and a one-way clutch 80a, which is an example of the clutch configured to switch transmission of the drive force from the drive motor 33 to the fan 34.

The one-way clutch 80a is arranged between the drive motor 33 and the fan 34, and is attached to the rotary shaft 33a provided at the rear side of the drive motor 33 (an opposite side to the striking mechanism 20). The one-way clutch 80a is configured to transmit the drive force, which is to be generated during the positive rotation drive of the drive motor 33, to the fan 34. Also, the drive force of the drive motor 33 is not transmitted to the fan 34 during stop, deceleration or reverse rotation (hereinafter, referred to as 'stop or the like') of the drive motor 33. That is, when the drive motor 33 stops or when the rotation of the fan 34 in one direction is faster than the rotation of the drive motor 33, the fan 34 is separated from the rotary shaft 33a by the one-way clutch 80a, so that the drive force of the drive motor 33 is not transmitted to the fan 34.

The fan 34 is attached to the rotary shaft 33a of the drive motor 33 via the one-way clutch 80a. The fan 34 is configured to rotate integrally with the drive motor 33 on the basis of the drive force (rotating force) of the drive motor 33 to be transmitted via the one-way clutch 80a, during the drive of the one-way clutch 80a. Also, the fan 34 is separated from the rotary shaft 33a by the one-way clutch 80a during the stop or the like of the motor 33, so that the fan is rotated for predetermined time by the inertia based on the drive force transmitted during the drive of the drive motor 33, without being influenced by the state of the drive motor 33-side.

(Configuration Example of Striking Tool 1A)

Subsequently, an example of an operation that is performed during the striking of the striking tool 1A is described.

When the contact arm 11a of the nose part 11 of the striking tool 1A is pressed to a target and the trigger 15 is pulled, the drive motor 33 is driven. In the modified embodiment, in conjunction with the drive of the drive motor 33 during the striking operation, the drive force of the drive motor 33 is transmitted to the fan 34 via the one-way clutch 80a. Thereby, the fan 34 is rotated in conformity to the drive of the drive motor 33 and ejects the wind to the drive motor 33, thereby cooling the drive motor 33.

On the other hand, when the striking operation is completed, the drive motor 33 is stopped. In conjunction with the stop of the drive motor 33, the rotary shaft 33a of the drive motor 33 and the fan 34 are separated by the one-way clutch 80a. Therefore, during the stop or the like of the drive motor 33, the drive force is not transmitted to the fan 34 but the fan 34 is continuously rotated only for predetermined time by the inertia based on the drive force transmitted during the drive of the drive motor 33. Thereby, even after the drive motor 33 is stopped, it is possible to cool the drive motor 33 by ejecting the wind to the drive motor 33.

As described above, according to the modified embodiment, it is possible to cool the drive motor 33 for predetermined time by the fan 34 even after the drive motor 33 is stopped as well as during the drive of the drive motor 33. Also, the striking tool 1A of the modified embodiment adopts the configuration where the one-way clutch 80a is arranged between the drive motor 33 and the fan 34. Therefore, it is possible to improve the effect of cooling the drive motor 33 at low cost by the simple structure. Also, according to the modified embodiment, when performing the continuous striking operation, it is possible to transmit the drive force of the drive motor 33 to the fan 34 every striking operation. Therefore, during the continuous striking operation, it is possible to cool the drive motor 33 by continuously rotating the fan 34.

Also, in a general electric tool, a fan is attached to a rotary shaft of a drive motor. In this case, however, a total weight of a rotor configuring the drive motor increases, so that the inertia increases. Therefore, it is difficult to stop the drive motor at a desired stop position. In an electric nailing machine, in order to rapidly execute a next striking operation (in order to improve responsiveness after the trigger operation), the plunger is stopped at a position close to a top dead center. However, when the fan is attached to the drive motor, it may influence the control on the stop position of the plunger. In contrast, according to the modified embodiment, the one-way clutch 80a is arranged between the drive motor 33 and the fan 34 and the fan 34 is attached to the one-way clutch 80a. Therefore, it is possible to avoid the inertia influence of the fan 34 on the rotor during the stop of the drive motor 33. Thereby, while it is possible to stop the drive motor 33 at a desired position with high accuracy, it is possible to cool the drive motor 33. Also, it is possible to control the stop position of the plunger 25 with high accuracy.

In the modified embodiment, the one-way clutch 80a has been used as an example of the clutch. However, the present invention is not limited thereto. For example, the electromagnetic clutch or the like can be used as the clutch. That is, the electromagnetic clutch may be arranged between the drive motor 33 and the fan 34. In this case, for example, the clutch is disconnected by the control of the control unit 60 before the drive motor 33 is stopped, and when the drive motor 33 is stopped, the rotary shaft 33a facing toward the fan 34 is rotated by the inertia, so that it is possible to continuously rotate the fan 34 for predetermined time.

In the meantime, the technical scope of the present invention is not limited to the above illustrative embodiment, and the illustrative embodiment can be diversely changed without departing from the gist of the present invention.

For example, when the cooling mode is executed after the striking operation is over by a worker, the worker may recognize a driving sound of the drive motor 33, as a noise. Therefore, in addition to the illustrative embodiment, an operation unit with which the worker can stop the operation of the cooling mode may be provided to the striking tool 1. Also, the operation of the cooling mode may be stopped by wireless communication through an operation on a portable information terminal or the like. Also, a setting for not executing the cooling mode may be performed with the operation unit.

Also, even during the cooling mode, when the usual operation on the trigger 15 is performed, the clutch 80 may be connected so that the striking operation is to be executed. Also, during the cooling mode, the operation on the trigger 15 may not be received so that the striking operation is not to be executed. In the configuration where the striking operation is not executed during the cooling mode, the striking tool 1 may be provided with a display unit configured to notify the cooling mode. As the notifying means, a voice or a warning sound may be used, in addition to the display unit.

Also, in the illustrative embodiment, the type where the plunger 25 and the plunger spring 26 are used is adopted as the striking mechanism 20. However, the present invention is not limited thereto. For example, a type where a flywheel, an air spring, a gas spring and the like are used may be adopted as the striking mechanism 20.

Also, in the illustrative embodiment, the battery is used as the power supply of the striking tool 1. However, the present invention is not limited thereto. For example, an AC power supply may be used as the power supply of the striking tool 1.

According to an aspect of the invention, there is provided a striking tool comprising: a striking mechanism configured to strike a fastener into a member to be struck; a motor configured to drive the striking mechanism; and a clutch provided between the striking mechanism and the motor and configured to switch transmission and interruption of a drive force of the motor to the striking mechanism.

According to the above aspect of the invention, since it is possible to cool the motor by driving the motor in the state where the transmission of the drive force of the motor to the striking mechanism is interrupted by the clutch, it is possible to increase the service time of the striking tool and to use the motor for high output.

According to an aspect of the invention, there is also provided a striking tool comprising: a striking mechanism configured to strike a fastener into a member to be struck; a motor configured to drive the striking mechanism; a cooling unit configured to cool the motor; and a clutch provided between the motor and the cooling unit, the clutch configured to transmit a drive force to the cooling unit during drive of the motor and to interrupt transmission of the drive force to the cooling unit during stop or deceleration of the motor.

According to the above aspect of the invention, even after the motor is stopped, since it is possible to drive the cooling unit by the inertia of the drive force generated during the drive of the motor, it is possible to improve the effect of cooling the motor.

What is claimed is:

1. A striking tool comprising:
   a striking mechanism configured to strike a fastener into a member to be struck;
   a motor configured to drive the striking mechanism;
   a clutch provided between the striking mechanism and the motor and configured to switch transmission and interruption of a drive force of the motor to the striking mechanism; and
   a control unit configured to execute a cooling mode of cooling the motor in which the clutch is disconnected and transmission of the drive force of the motor to the striking mechanism is interrupted by the clutch,
   wherein the control unit is configured to connect the clutch and execute a striking operation in response to actuation of a trigger during the cooling mode in which the clutch is disconnected and the clutch interrupts the drive force of the motor to the striking mechanism.

2. The striking tool according to claim 1, wherein, during the cooling mode, a cooling unit is driven by the motor, the transmission of the drive force of the motor to the striking mechanism being interrupted.

3. The striking tool according to claim 2, wherein the cooling unit is a fan that is driven by the drive force of the motor.

4. The striking tool according to claim 1, wherein the control unit is configured to control a striking operation of the striking mechanism by controlling connection or disconnection of the clutch.

5. The striking tool according to claim 1, wherein
   the clutch is a one-way clutch configured to switch the transmission and the interruption of the drive force of the motor to the striking mechanism in accordance with a first rotating direction or a second rotating direction of the motor, and
   the control unit is configured to switch motor rotation to the second rotating direction during the cooling mode.

6. The striking tool according to claim 1, further comprising:
   a temperature sensor configured to measure a temperature, wherein
   the control unit is configured to control connection or disconnection of the clutch, based on information about the temperature measured by the temperature sensor.

7. The striking tool according to claim 1, wherein the control unit is configured to acquire a number of times of actual striking performed by the striking mechanism and to control connection or disconnection of the clutch, based on the acquired number of times of actual striking.

8. The striking tool according to claim 1, wherein an operation of the cooling mode is configured to be stoppable.

9. The striking tool according to claim 5, wherein:
   the one-way clutch is configured to be engaged during rotation of the motor in the first rotating direction to transmit the drive force to the striking mechanism;
   the one-way clutch is configured to interrupt transmission of the drive force during rotation of the motor in the second direction such that the drive force is not transmitted to the striking mechanism, and
   wherein during rotation of the motor in the second direction, the motor drives a cooling unit.

10. The striking tool according to claim 5, wherein the motor rotating in the second rotating direction causes a fan to blow air towards the motor to cool the motor.

11. The striking tool according to claim 1, wherein upon the control unit terminating the cooling mode without actuation of the trigger, the control unit turns off the motor and connects the clutch.

12. The striking tool according to claim 1, wherein the control unit is configured to switch from the striking operation to the cooling mode with continuous operation of the motor.

13. A striking tool comprising:
   a striking mechanism configured to strike a fastener into a member to be struck;
   a motor configured to drive the striking mechanism;
   a cooling unit configured to cool the motor;
   a clutch provided between the motor and the cooling unit, the clutch configured to transmit a drive force to the cooling unit during drive of the motor and to interrupt transmission of the drive force to the cooling unit during stop or deceleration of the motor; and
   a control unit configured to execute a cooling mode of cooling the motor in which the clutch is disconnected and transmission of the drive force of the motor to the striking mechanism is interrupted by the clutch,
   wherein the control unit is configured to connect the clutch and execute a striking operation in response to actuation of a trigger during the cooling mode in which the clutch is disconnected and the clutch interrupts the drive force of the motor to the striking mechanism.

14. The striking tool according to claim 13, wherein the clutch is a one-way clutch configured to transmit only a drive force of a specific direction, and configured to interrupt the transmission of the drive force to the cooling unit when rotation of the cooling unit in the specific direction is faster than rotation of the motor.

15. The striking tool according to claim 13, wherein upon the control unit terminating the cooling mode without actuation of the trigger, the control unit turns off the motor and connects the clutch.

16. The striking tool according to claim 13, wherein the control unit is configured to switch from the striking operation to the cooling mode with continuous operation of the motor.

* * * * *